United States Patent
Patten et al.

(10) Patent No.: US 11,774,275 B2
(45) Date of Patent: Oct. 3, 2023

(54) METHOD OF PROVING MULTIPLE CORIOLIS FLOW METERS INTEGRATED ON A COMMON PLATFORM

(71) Applicant: MICRO MOTION, INC., Boulder, CO (US)

(72) Inventors: Andrew Timothy Patten, Boulder, CO (US); Charles Depenning, Boulder, CO (US)

(73) Assignee: MICRO MOTION, INC., Boulder, CO (US)

( * ) Notice: Subject to any disclaimer, the term of this patent is extended or adjusted under 35 U.S.C. 154(b) by 311 days.

(21) Appl. No.: 16/973,314

(22) PCT Filed: Jun. 7, 2019

(86) PCT No.: PCT/US2019/035950
§ 371 (c)(1),
(2) Date: Dec. 8, 2020

(87) PCT Pub. No.: WO2019/245752
PCT Pub. Date: Dec. 26, 2019

(65) Prior Publication Data
US 2021/0247220 A1 Aug. 12, 2021

Related U.S. Application Data

(60) Provisional application No. 62/687,879, filed on Jun. 21, 2018.

(51) Int. Cl.
*G01F 1/84* (2006.01)

(52) U.S. Cl.
CPC ......... *G01F 1/8436* (2013.01); *G01F 1/8477* (2013.01)

(58) Field of Classification Search
CPC ........................... G01F 1/8436; G01F 1/8477
USPC ......................................................... 73/1.01
See application file for complete search history.

(56) References Cited

U.S. PATENT DOCUMENTS

| | | |
|---|---|---|
| 5,072,416 A | 12/1991 | Francisco, Jr. et al. |
| 6,378,354 B1 * | 4/2002 | Sharp ..................... G01F 25/10 73/1.16 |
| 7,028,528 B2 | 4/2006 | Antonijevic |

FOREIGN PATENT DOCUMENTS

| | | | |
|---|---|---|---|
| GB | 2376080 A | * 12/2002 | ........... G01F 1/8472 |
| GB | 2376080 A | 12/2002 | |
| WO | 2005040734 A1 | 5/2005 | |
| WO | 2017143577 A1 | 8/2017 | |

* cited by examiner

*Primary Examiner* — Nathaniel T Woodward
(74) *Attorney, Agent, or Firm* — The Ollila Law Group LLC

(57) ABSTRACT

A method for proving or calibrating a first flow meter integrated into a common platform with a second flow meter is provided. The first flow meter comprises a first driver, a first flow tube, and a first meter electronics, and the second flow meter comprises a second driver, a second flow tube, and a second meter electronics. The method includes configuring the first flow meter to vibrate the first flow tube with a first driver voltage at a first default driver voltage amplitude using the first meter electronics, and configuring the second flow meter to vibrate the second flow tube with a second driver voltage at a second standby driver voltage amplitude using the second meter electronics.

15 Claims, 3 Drawing Sheets

METHOD OF PROVING MULTIPLE CORIOLIS FLOW METERS INTEGRATED ON A COMMON PLATFORM

TECHNICAL FIELD

The embodiments described below relate to methods of proving Coriolis flow meters, more particularly, to proving a Coriolis flow meter integrated with other Coriolis flowmeters on a common platform.

BACKGROUND

Coriolis flow meters are one type of flow meter that may be used to measure the mass flow rate, density, volume flow rate, and other information for flowing materials. The flowing materials can include liquids, gases, combined liquids and gases, solids suspended in liquids, and liquids including gases and suspended solids.

FIG. 1 depicts example Coriolis flow meter 100 comprising a meter assembly and meter electronics 20. Meter assembly 10 responds to changes in a process material flow. Meter electronics 20 is connected to meter assembly 10 via leads 102 to provide density, volumetric flow rate, and mass flow rate information over meter electronics interface 26, in addition to other information.

Meter assembly 10 includes a pair of manifolds 150 and 150', flanges 103 and 103', a pair of parallel flow tubes 130 and 130', driver 180, and a pair of velocity pick-off sensors 170L and 170R. Flow tubes 130 and 130' bend at two symmetrical locations along their length and are essentially parallel throughout their length. Brace bars 140 and 140' serve to define an axis about which each flow tube oscillates.

When flanges 103 and 103' are connected, via inlet end 104 and exit end 104' into a process line (not shown) which carries the process material that is being measured, material enters inlet end 104 of the meter through flange 103 is conducted through manifold 150 to flow tube mounting block 120. Within manifold 150 the material is divided and routed through flow tubes 130 and 130'. Upon exiting flow tubes 130 and 130', the process material is recombined in a single stream within manifold 150' and is thereafter routed to exit end 104' connected by flange 103' to the process line (not shown).

Both flow tubes 130 and 130' are driven by driver 180 in opposite directions and at what is termed the first out-of-phase bending mode of the flowmeter. This driver 180 may comprise any one of many well-known arrangements, such as a magnet mounted to flow tube 130' and an opposing coil mounted to flow tube 130 and through which an alternating current is passed for vibrating both flow tubes. A suitable driver voltage is applied by meter electronics 20 to driver 180.

Meter electronics 20 provides the drive signal to driver 180 to vibrate flow tubes 130 and 130'. Meter electronics 20 receives the left and right velocity signals from velocity pick-off sensors 170L and 170R to compute the mass flow rate, volumetric rate, and/or density information for the flow passing through meter assembly 10.

In some flow meter applications, for example in oil and gas production, a high degree of meter accuracy is required. Custody transfer of oil and gas requires very accurate measurement, because errors can quickly add up to large revenue losses.

In order to support obtaining accurate flow measurements in the field, oil and gas operators often use a metering skid. A metering skid is a common platform or a frame upon which two or more Coriolis flow meters may be coupled. The flow meters are often fluidly connected in parallel or in series.

In some instances, the metering skid meters can be used in a "hot spare" scenario, where one meter is used to measure flow and at least one other meter is reserved for use as a backup or spare. In other instances, however, multiple meters may be used in parallel flow to measure flowrates that are higher than a single meter alone would have the capacity to measure. In further cases, one or more meters may be included on a skid to calibrate or prove other meters used for measurement.

When two or more meters are installed on a skid and operating in sufficiently close proximity to one another, it is sometimes possible for one meter to detect the vibrations of the one or more other meters. The vibrations of other meters may appear as noise or cross talk in a particular meter's respective left and right velocity pick-off sensors 170L and 170R.

In some circumstances, especially when the flow meters are similar in design, the operating frequency of the driver signals of the meters may mostly coincide, causing a relatively long period beat frequency to appear in the left and right velocity data. When the cross talk is a beat frequency, the noise provided in the left and right velocity data tends to be relatively large and slow-moving, typically no faster than 1 Hertz (Hz).

During normal meter operations, cross talk may not be a prohibitive problem because the period of the beat frequency can be much smaller than the period during which measurements are taken, which may allow for the errors induced by the interference between meters to cancel out. In other words, the positive errors that are induced are offset by the equal and opposite negative errors induced by the interference between meters.

When individual meters are proved or calibrated on the skid, however, the pass time of the prover is often less than a second, below the typical beat frequency of 1 Hz. During proving operations, the beat frequency due to the constructive interference caused by the crosstalk phenomenon can therefore appear in the data as an error with high repeatability. The error caused by the beat frequency may be even more pronounced when small volume provers are used, which use an even shorter individual pass time.

For the meter manufacturer, addressing the problem of a beat frequency between individual meters coupled to a skid is further complicated by the fact that the high-level operations between the meters and the prover are generally facilitated through a customer computer with customer software. Prior solutions to the beat frequency problem have included turning off the meters not being proved. Powering off one or more meters often disturbs the control systems implemented in the customer computer, however, which require communication and updates from the flow meters to operate without causing faults and alarms. Moreover, solutions that require custom meter electronics or custom meter software increase the cost of the meter electronics and remove the plug and play nature of the meter product.

What is needed is a method to prove a flow meter integrated onto a skid that reduces measurement error due to cross talk from other meters on the skid and is inexpensive to implement.

SUMMARY

In a first embodiment, a method for at least one of proving or calibrating a first flow meter integrated into a common platform with a second flow meter is provided. The first flow meter comprises a first driver, a first flow tube, and a first meter electronics, and the second flow meter comprises a second driver, a second flow tube, and a second meter electronics. The method comprises configuring the first flow meter to vibrate the first flow tube with a first driver voltage at a first default driver voltage amplitude using the first meter electronics. The method further comprises configuring the second flow meter to vibrate the second flow tube with a second driver voltage at a second standby driver voltage amplitude using the second meter electronics.

In a second embodiment, a central operations processing unit operable to at least one of prove or calibrate a first flow meter integrated into a common platform with a second flow meter is provided. The central operations processing unit comprises a central operations memory and a central operations processor and can perform any of the methods of the first embodiment.

In a third embodiment, a system for at least one of proving or calibrating a first flow meter integrated into a common platform with a second flow meter is provided. The system can perform any of the methods of the first embodiment and comprises a first flow meter comprising a first driver and a first flow tube, the first flow meter integrated into a common platform with a second flow meter. The system further comprises a second flow meter comprising a second driver, a second flow tube, and a first meter electronics. The system further comprises a central operations processing unit comprising a central operations memory and a central operations processor.

ASPECTS

According to an aspect, the method may further comprise proving the first flow meter.

According to an aspect, the second standby driver voltage amplitude may be 20 percent or less of a second default driver voltage amplitude.

According to an aspect, the method may further comprise configuring the first flow meter electronics to vibrate the first flow tube with the first driver voltage at a first standby driver voltage amplitude, configuring the second flow meter electronics to vibrate the second flow tube with the second driver voltage at a second default driver voltage amplitude, and proving the second flow meter.

According to an aspect, the first standby driver voltage amplitude may be 20 percent or less of the first default driver voltage amplitude.

According to an aspect, the second standby driver voltage amplitude may be zero.

According to an aspect, the first standby driver voltage amplitude may be zero.

According to an aspect, the first flow tube and the second flow tube may comprise a substantially same diameter and a substantially same length.

According to an aspect, the method may further comprise halting a flow of a process fluid to the first flow meter and the second flow meter, monitoring for a leak using the second flow meter.

According to an aspect, proving the first flow meter may further comprise providing a flow of proving fluid to the first flow meter, the flow of proving fluid having a separately verified volume.

According to an aspect, configuring the second flow meter to vibrate the second flow tube with a second driver voltage at a second standby driver voltage amplitude may further comprise commanding a transmitter to configure the second flow meter electronics.

According to an aspect, configuring the first flow meter electronics to vibrate the first flow tube with the first driver voltage at the first default driver voltage amplitude may further comprise commanding a transmitter to configure the first flow meter electronics coupled to the first flow meter.

According to an aspect, the method may further comprise at least one of: setting a density value to a last known good value, setting a mass flow value to zero, setting a volume flow value to zero, or suppressing an alarm mode.

According to an aspect, a computer program configured to at least one of prove or calibrate a first flow meter integrated into a common platform with a second flow meter.

BRIEF DESCRIPTION OF THE DRAWINGS

The same reference number represents the same element on all drawings. It should be understood that the drawings are not necessarily to scale.

DETAILED DESCRIPTION

Figure 2:
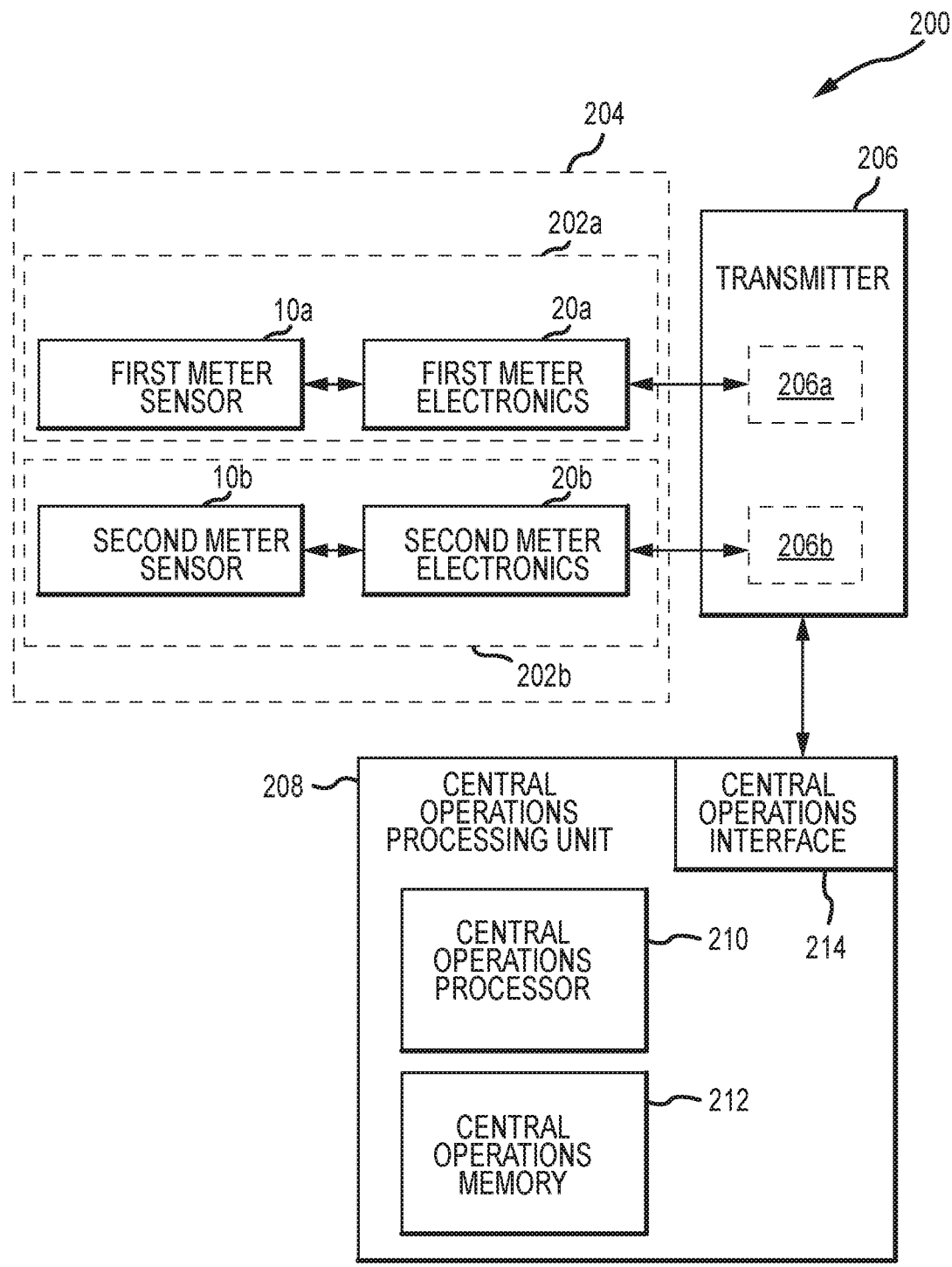
FIG. 2 depicts a flow meter system 200, in accordance with an embodiment.
Figure 3:
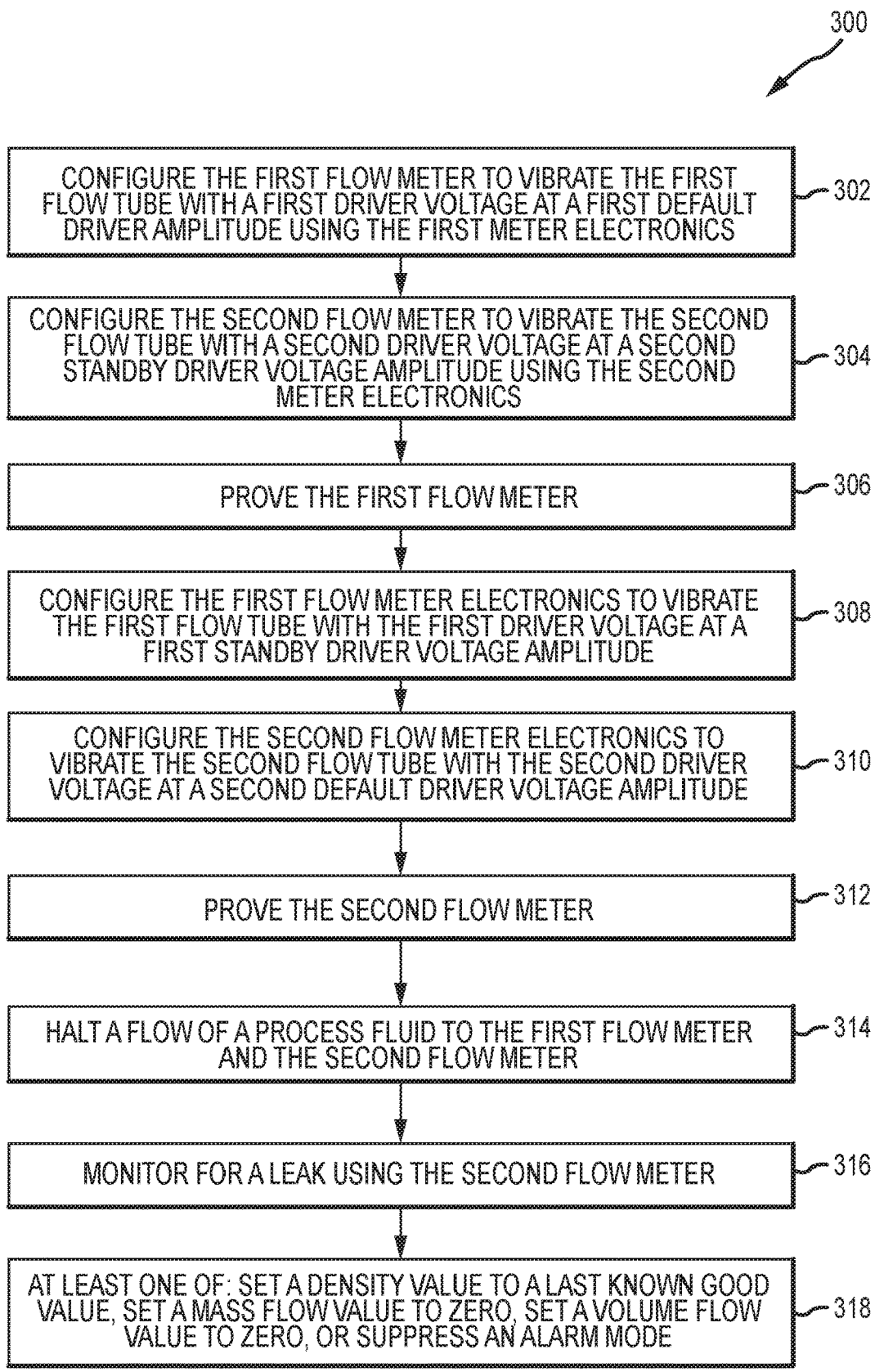
FIG. 3 depicts a method 300, in accordance with an embodiment.

FIGS. 2-3 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below may be combined in various ways to form multiple variations of the Application. As a result, the Application is not limited to the specific examples described below, but only by the claims and their equivalents.

Figure 1:
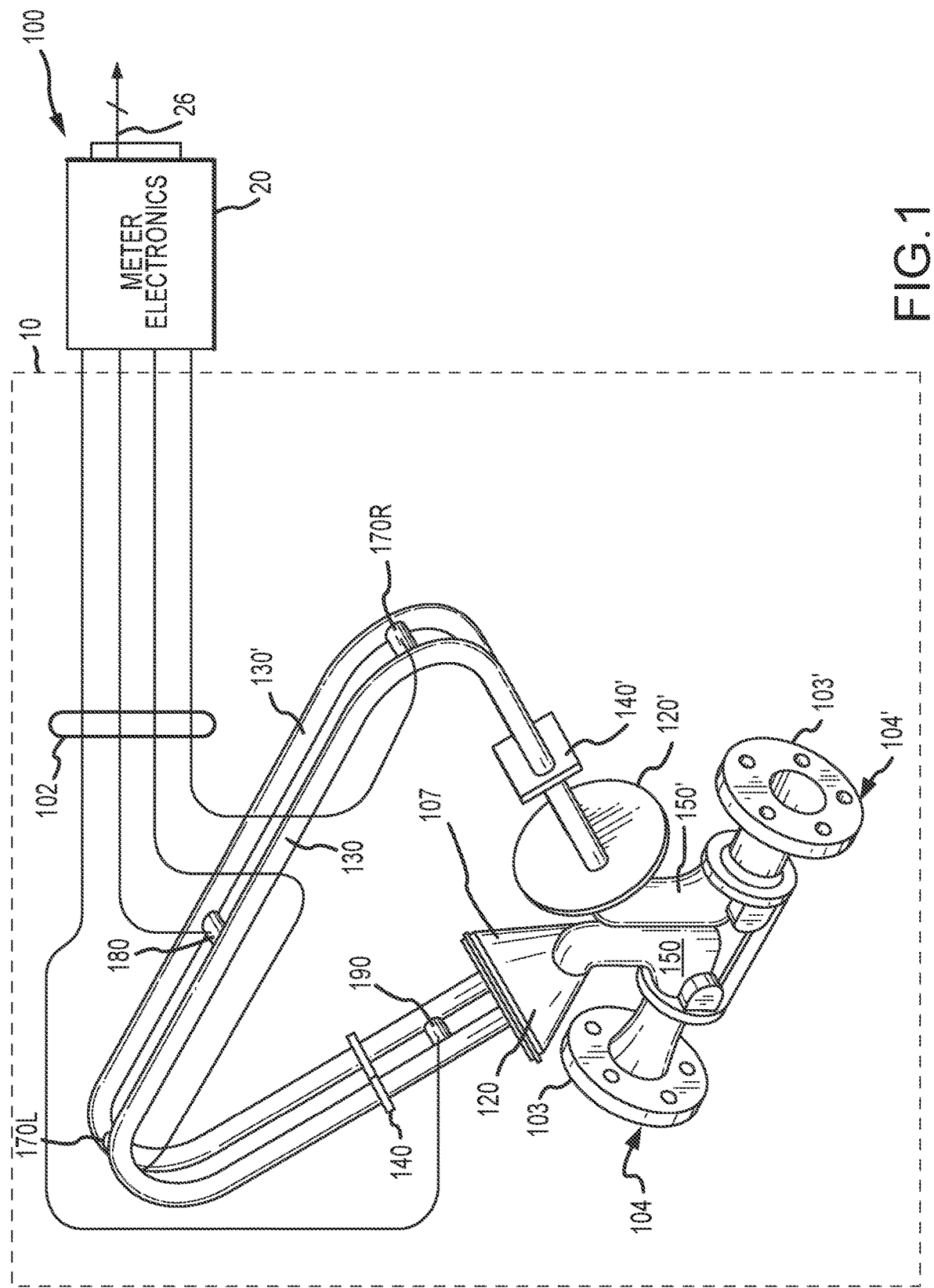
FIG. 1 depicts a flow meter 100, in accordance with an embodiment.

FIG. 1 depicts a flow meter 100 comprising a meter assembly 10 and meter electronics 20, as described in the background section. In examples, flow meter 100 may be integrated into a common platform (not depicted in FIG. 1), for example a meter skid, with other flow meters.

While flow meter 100 in FIG. 1 depicts a Coriolis flow meter, this is not intended to be limiting. As those of skill will readily understand, flow meter 100 may comprise any type of vibratory flow meter known to those of skill. In further embodiments, flow meter 100 may comprise one or more curved or straight flow tubes.

FIG. 2 depicts system 200, in accordance with an embodiment. System 200 includes a first flow meter 202a and a second flow meter 202b integrated onto a common platform 204. System 200 further includes a central operations processing unit 208. In examples, system 200 may further comprise transmitter 206, as will be further described below.

Common platform 204 may comprise any structure upon which two or more flow meters may be mounted or coupled to. In embodiments, common platform 204 may comprise, for example, a meter skid. While common platform 204 is depicted in FIG. 2 as comprising two flow meters, this is not intended to be limiting. As those of skill will readily understand, common platform 204 may include any number of flow meters.

In embodiments, first flow meter 202a and second flow meter 202b may each comprise an instance of flow meter 100. In embodiments, first flow meter 202a and second flow meter 202b may comprise the same model of meter. In further embodiments, however, first flow meter 202a and second flow meter 202b may comprise similar models of flow meter. For example, first flow meter 202a and second flow meter 202b may comprise models of flow meter with any combination of the following features: similar flow tube diameters, similar flow tube lengths, similar tube materials, similar case dimensions, similar case materials, similar driver components, or similar pick-off components. First flow meter 202a and second flow meter 202b may further comprise any other similar configurations that make them likely to produce a beat frequency when operated together, as will be understood by those of skill.

Central operations processing unit 208 comprises central operations processor 210, central operations memory 212, and a central operations interface 214. Central operations processing unit 208 may be configured to operate one or more flow meters integrated onto common platform 204. In embodiments, central operations processing unit 208 may be operable to send commands to and receive telemetry from first flow meter 202a and second flow meter 202b. For example, central operations processing unit 208 may send commands to and receive telemetry from a first meter electronics 20a of first flow meter 202a, and a second meter electronics 20b of second flow meter 202b. In embodiments, central operations processing unit 208 may be customized or adapted by a flow meter customer to a specific industry application.

Central operations processor 210 executes computer instructions, which perform a portion or all of method 300 described in relation to FIG. 3. In embodiments, central operations processor 210 may include a single, or any multiple number of processors, as will be understood by those of skill in the art.

Central operations memory 212 may be an electronically readable medium or a computer readable medium configured to store computer program instructions. In examples, central operations memory 212 may include a non-transitory medium. Stored computer program instructions, when executed on the central operations memory 212, may perform a portion or all of the methods described in relation to FIG. 3.

In examples, portions of the method described in relation to FIG. 3 may be stored or executed outside of system 200. For example, a portion of the method described in relation to FIG. 3 may be stored or executed on a combination of a server and cloud storage facility via the Internet.

Central operations processing unit 208 further comprises a central operations interface 214. Central operations interface 214 may be configured to communicate with devices external to central operations processing unit 208. Through central operations interface 214, central operations processing unit 208 may communicate with the flow meters integrated onto common platform 204. For example, central operations interface 214 may allow central operations processing unit 208 to communicate with first and second meter electronics 20a and 20b. In embodiments, central operations interface 214 may communicate via any wired or unwired interface known to those of skill.

In embodiments, central operations processing unit 208 may communicate with one or more flow meters integrated onto common platform 204 via one or more intermediate electronic devices. For example, central operations processing unit 208 may communicate with one or more flow meters via a transmitter 206.

Transmitter 206 may be operable to transmit commands received from central operations processing unit 208 to first and second flow meters 202a and 202b. Transmitter 206 may further be operable to transmit telemetry received from first and second flow meters 202a and 202b to central operations processing unit 208. In embodiments, transmitter 206 may be configured to communicate via any wireless or wired medium with central operations processing unit 208 and any number of flow meters.

In embodiments, transmitter 206 may comprise one or more transmitters. For example, transmitter 206 may comprise a first transmitter 206a, configured to communicate with first meter electronics 20a and central operations processing unit 208, and a second transmitter 206b, configured to communicate with second meter electronics 20b and central operations processing unit 208. In embodiments, first and second transmitters 206a and 206b may be integrated into first and second flow meters 202a and 202b or separate from first and second flow meters 202a and 202b.

In embodiments, two or more of central operations processing unit 208, transmitter 206, first meter electronics 20a, or second meter electronics 20b may be operable to communicate via one or more communications protocols. For example, central operations interface 214 may be operable to communicate via Modbus, or any other communications protocol known to those of skill.

FIG. 3 depicts method 300, in accordance with an embodiment. Method 300 may be used for at least one of proving or calibrating first flow meter 202a integrated into common platform 204 with second flow meter 202b, with first flow meter 202a comprising a first driver 180, a first flow tube 130, and first meter electronics 20a, and second flow meter 202b comprising a second driver 180, a second flow tube 130, and a second meter electronics 20b.

Method 300 begins with step 302. In step 302, the first flow meter is configured to vibrate the first flow tube with a first driver voltage at a first default driver voltage amplitude using the first meter electronics. Step 302 may place the first flow meter into a normal operational mode where the first flow meter is operable to make nominal flow measurements. The first driver voltage is output from first meter electronics 20a to first driver 180 and is operable to actuate one or more flow tubes of first meter sensor 10a.

A first driver voltage is a voltage operable to actuate driver 180. The first default driver voltage amplitude is the typical operational driver voltage amplitude for a particular meter model. A flow meter's Coriolis twisting force can be relatively small, and a meter's flow tubes can be relatively stiff. In order to make a flow tube vibrate with sufficient amplitude to make the Coriolis twisting force detectable, meter electronics typically provide an AC driver voltage to driver 180 to vibrate a flow tube at its natural frequency. This allows meter electronics 20a, 20b to provide output that continuously maximizes the transmissivity ratio or drive gain in a conventional manner for Coriolis flow meters. The first default driver voltage amplitude is typically set at an optimal level whereby the drive gain of the meter is maximized without damaging the meter from excessive flow tube movement.

Method 300 continues with step 304. In step 304, the second flow meter is configured to vibrate the second flow tube with a second driver voltage at a second standby driver voltage amplitude using the second meter electronics. Step 304 may place the second flow meter into a standby operational mode. In step 304, the second driver voltage is output from second meter electronics 20b to first driver 180 and is operable to actuate one or more flow tubes of second meter sensor 10b.

The second standby driver voltage amplitude is lower than a default second default driver voltage amplitude, the second default driver voltage amplitude being selected based on criteria similar to those used to select the first default driver voltage amplitude for the first flow meter. The second standby driver voltage amplitude is low enough to prevent substantially all of the beat frequency experienced when the first flow meter 202a and the second flow meter 202b are operated with their respective default driver voltage amplitudes at the same time.

In embodiments where the first flow meter 202a and the second flow meter 202b are the same meter model, or comprise substantially the same meter components and dimensions, the second standby voltage amplitude for the second flow meter may be 20 percent or less of the first default voltage amplitude for the first flow meter.

In embodiments, the second standby driver voltage amplitude may be 20 percent or less of a second default driver voltage amplitude. In further embodiments, however, the second standby driver voltage amplitude may be lower.

By vibrating a flow tube of the second flow meter 202b with a second standby driver voltage amplitude that is less than a second default driver voltage amplitude while the first flow meter 202a vibrates a respective flow tube at the first default voltage amplitude, it may be possible to effectively remove a beat frequency sensed at one or more of the respective meter pickoff sensors, thereby improving the accuracy of the first flow meter 202a proving run. By selecting a second default driver voltage amplitude that is not zero, it may be possible to obtain flow meter data using the second flow meter 202b to detect leaks while the first flow meter 202a is being proved. This may allow for operators to continuously monitor for leaks in the system during a proving run. Keeping first flow meter 202a and second flow meter 202b powered on, with the second flow meter 202b operating at a second default driver voltage amplitude to avoid mechanical interference in the sensor data, may further allow operators to avoid the disruption that powering down a meter can cause to control algorithms executed by the central operations processing unit 208.

By keeping the second flow meter 202b operational with a lower driver amplitude while proving the first flow meter 202a, it may also be faster to bring the second flow meter 202b back up to an operational driver amplitude after the proving run for the first flow meter 202a is complete. This may provide for proving runs that are faster, minimizing meter downtime, along with the associated costs.

As those of skill will readily understand, step 304 may comprise configuring any number of additional flow meters to vibrate their respective flow tubes with a driver voltage at a standby driver voltage amplitude using the respective meter electronics.

In embodiments, method 300 may comprise further steps. For example, method 300 may further comprise step 306. In step 306, the first flow meter may be proved using any method known to those in the art.

In embodiments, proving the first flow meter may further comprise providing a flow of proving fluid having a separately verified volume to the first flow meter.

In embodiments, method 300 may comprise further steps. For example, method 300 may comprise steps 308 and 310. In step 308, the first flow meter electronics may be configured to vibrate the first flow tube with the first driver voltage at a first standby driver voltage amplitude. Step 308 is similar to step 302, except that it applies to first flow meter 202a.

In step 310, the second flow meter electronics may be configured to vibrate the second flow tube with the second driver voltage at a second default driver voltage amplitude. Step 310 is similar to step 304, except that it applies to the second flow meter 202b.

In embodiments, the first standby driver voltage amplitude may be 20 percent or less of the first default driver voltage amplitude. In further embodiments, however the first standby driver voltage amplitude may be nearly zero, or zero.

In embodiments, method 300 may further comprise step 312. In step 312, the second flow meter may be proved. In further embodiments, however, step 312 may comprise calibrating the second flow meter.

In embodiments, the first flow tube and the second flow tube may comprise a substantially same diameter and/or a substantially same length. In embodiments, substantially the same diameter or substantially the same length may mean that the diameter and/or length of the first flow meter is within 20% of the diameter and/or length of the second flow meter. In further embodiments, however, substantially the same diameter or substantially the same length may mean that the diameter and/or length of the first flow meter is within 10% of the diameter and/or length of the second flow meter.

In embodiments, method 300 may further comprise steps 314 and 316. In step 314, a flow of a process fluid may be halted to the first flow meter and the second flow meter.

In step 316, a leak may be monitored using the second flow meter. By configuring the second flow meter electronics to vibrate the second flow tube with a second driver voltage at the second standby driver voltage that is greater than zero while the flow of the process fluid is stopped, it may be possible to use the second flow meter to continue to monitor for leaks without incurring a beat frequency.

In embodiments, configuring first flow meter electronics 20a to vibrate the first flow tube with the first driver voltage at the first default driver voltage amplitude may further comprise commanding transmitter 206, 206a to configure the first flow meter electronics 20a coupled to the first flow meter 202a.

In embodiments, configuring second flow meter 202b to vibrate the second flow tube with a second driver voltage at a second standby driver voltage amplitude may further comprise sending a command to central operations processing unit 208 to transmitter 206, 206b to configure the second flow meter electronics 20b.

In embodiments, transmitter 206, 206a, 206b may include stored computer program instructions saved on a transmitter memory (not pictured) that is operable to configure one or more flow meters into a standby mode, wherein the one or more flow meters include a driver voltage set to a standby driver voltage amplitude. Transmitter 206, 206a, 206b may further include stored computer program instructions saved on a transmitter memory that is operable to configure one or more flow meters into an operational mode, wherein the one or more flow meters include a driver voltage set to a default driver voltage amplitude.

In embodiments, method 300 may further comprise step 318. In step 318, at least one of: setting a density value to a last known good value, setting a mass flow value to zero, setting a volume flow value to zero, or suppressing an alarm mode may be performed. The density value, mass flow value, or volume flow value are all values measured by a flow meter but tracked by the transmitter 206 or the central operations processing unit 208. The alarm mode is an alarm at the transmitter 206 or the central operations processing unit 208 configured to alert users to error conditions. Step 318 may allow for the transmitter 206 or the central operations processing unit 208 to suppress errors or alarms that might be triggered when a flow meter is operated with a standby driver voltage amplitude.

The following represents an embodiment of how central operations processing unit 208 or transmitter 206, 206a, 206b may configure first and second meter electronics 20a and 20b integrated onto common platform 204 to execute the steps of method 300. In embodiments, stored computer program instructions may execute any part of the pseudo-code on any combination of central operations processing unit 208 or transmitter 206, 206a, 206b.

1. Send command to first meter electronics 20a to configure to vibrate the first flow tube with a first driver voltage at a first default driver voltage amplitude using the first meter electronics;
2. Set density value to a last known good value, mass flow value to zero, and volume flow value to zero for second flow meter;
3. Suppress alarm modes for second flow meter;
4. Send command to second meter electronics 20b to vibrate the second flow tube with a second driver voltage at a second standby driver voltage amplitude using the second meter electronics;
5. Wait until the first flow meter is proved;
6. Send command to second meter electronics 20b to vibrate the second flow tube with a second driver voltage at a second default driver voltage amplitude using the second meter electronics;
7. Set density value to current measured density value, mass flow value to current measured mass flow value, and volume flow value to current measured volume flow value for second flow meter;
8. Set density value to a last known good value, mass flow value to zero, and volume flow value to zero for first flow meter;
9. Suppress alarm modes for first flow meter;
10. Send command to first meter electronics 20a to place it in Standby Mode to vibrate the first flow tube with a first driver voltage at a first standby driver voltage amplitude using the first meter electronics;
11. Wait until the second flow meter is proved;
12. Send command to first meter electronics 20a to vibrate the first flow tube with a first driver voltage at a first default driver voltage amplitude using the first meter electronics; and
13. Set density value to current measured density value, mass flow value to current measured mass flow value, and volume flow value to current measured volume flow value for first flow meter.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. Accordingly, the scope of the embodiments described above should be determined from the following claims.

What is claimed is:

1. A method for at least one of proving or calibrating a first flow meter (202a) integrated into a common platform (204) with a second flow meter (202b), with the first flow meter (202a) comprising a first driver (180), a first flow tube (130), and a first meter electronics (20a), and the second flow meter (202b) comprising a second driver (180), a second flow tube (130), and a second meter electronics (20b), the method comprising:
configuring the first flow meter (202a) to vibrate the first flow tube (130) with a first driver voltage at a first default driver voltage amplitude using the first meter electronics (20a); and
configuring the second flow meter (202b) to vibrate the second flow tube (130) with a second driver voltage at a second standby driver voltage amplitude using the second meter electronics (20b).

2. A method according to claim 1, further comprising:
proving the first flow meter (202a).

3. A method according to claim 1, wherein the second standby driver voltage amplitude is 20 percent or less of a second default driver voltage amplitude.

4. A method according to claim 1, further comprising:
configuring the first flow meter electronics (20a) to vibrate the first flow tube (130) with the first driver voltage at a first standby driver voltage amplitude;
configuring the second flow meter electronics (20b) to vibrate the second flow tube (130) with the second driver voltage at a second default driver voltage amplitude; and
proving the second flow meter (202b).

5. A method of claim 4, wherein the first standby driver voltage amplitude is 20 percent or less of the first default driver voltage amplitude.

6. A method according to claim 4, wherein the first standby driver voltage amplitude is zero.

7. A method according to claim 1, wherein the second standby driver voltage amplitude is zero.

8. A method according to claim 1, wherein the first flow tube (130) and the second flow (130) tube comprise a same diameter and a same length.

9. A method according to claim 1, further comprising:
halting a flow of a process fluid to the first flow meter (202a) and the second flow meter (202b); and
monitoring for a leak using the second flow meter (202b).

10. A method according to claim 1, wherein proving the first flow meter (202a) further comprises providing a flow of proving fluid to the first flow meter (202a), the flow of proving fluid having a separately verified volume.

11. A method according to claim 1, wherein configuring the second flow meter (202b) to vibrate the second flow tube (130) with a second driver voltage at a second standby driver voltage amplitude further comprises commanding a transmitter (206, 206b) to configure the second flow meter electronics (20b).

12. A method according to claim 1, wherein configuring the first flow meter electronics (20a) to vibrate the first flow tube (130) with the first driver voltage at the first default driver voltage amplitude further comprises commanding a transmitter (206, 206a) to configure the first flow meter electronics (20a) coupled to the first flow meter (202a).

13. A method according to claim 1, further comprising:
at least one of: setting a density value to a last known good value, setting a mass flow value to zero, setting a volume flow value to zero, or suppressing an alarm mode.

14. A central operations processing unit (208) comprising a central operations memory (212) and a central operations processor (210) operable to at least one of prove or calibrate a first flow meter (202a) integrated into a common platform (204) with a second flow meter (202b), with the first flow meter (202a) comprising a first driver (180), a first flow tube (130), and a first meter electronics (20a), and the second flow meter (202b) comprising a second driver (180), a second flow tube (130), and a second meter electronics (20b), wherein the central operations memory includes instructions to:
 configure the first flow meter (202a) to vibrate the first flow tube (130) with a first driver voltage at a first default driver voltage amplitude using the first meter electronics (20a); and
 configure the second flow meter (202b) to vibrate the second flow tube (130) with a second driver voltage at a second standby driver voltage amplitude using the second meter electronics (20b).

15. A system (200) for at least one of proving or calibrating a first flow meter (202a) integrated into a common platform (204) with a second flow meter (202b), the system comprising:

the first flow meter (202a) comprising a first driver (180) and a first flow tube (130), the first flow meter (202a) integrated into a common platform (204) with a second flow meter (202b);

the second flow meter (202b) comprising a second driver (180), a second flow tube (130), and a first meter electronics (20a);

a central operations processing unit (208) comprising a central operations memory (212) and a central operations processor (210), the central operations memory including instructions to:

configure the first flow meter (202a) to vibrate the first flow tube (130) with a first driver voltage at a first default driver voltage amplitude using the first meter electronics (20a); and configure the second flow meter (202b) to vibrate the second flow tube (130) with a second driver voltage at a second standby driver voltage amplitude using the second meter electronics (20b).

\* \* \* \* \*